US008712839B2

(12) United States Patent
Steinert et al.

(10) Patent No.: US 8,712,839 B2
(45) Date of Patent: Apr. 29, 2014

(54) SYSTEM AND METHOD FOR MANAGING A LOYALTY PROGRAM VIA AN ASSOCIATION NETWORK INFRASTRUCTURE

(75) Inventors: Jan Allan Steinert, La Jolla, CA (US); Richard M. Elkus, Poway, CA (US)

(73) Assignee: 888Extramoney.com, LLC, San Diego, CA (US)

( * ) Notice: Subject to any disclaimer, the term of this patent is extended or adjusted under 35 U.S.C. 154(b) by 709 days.

(21) Appl. No.: 12/782,442

(22) Filed: May 18, 2010

(65) Prior Publication Data

US 2011/0288923 A1 Nov. 24, 2011

(51) Int. Cl.
*G06Q 30/00* (2012.01)
(52) U.S. Cl.
USPC .................................................. 705/14.1
(58) Field of Classification Search
USPC .............................................. 705/14
See application file for complete search history.

(56) References Cited

U.S. PATENT DOCUMENTS

| | | | |
|---|---|---|---|
| 5,287,268 A | 2/1994 | McCarthy | |
| 5,832,458 A | 11/1998 | Jones | |
| 7,487,912 B2 | 2/2009 | Seifert et al. | |
| 7,496,524 B2 | 2/2009 | Voltmer et al. | |
| 2002/0077904 A1 | 6/2002 | Ali | |
| 2002/0082920 A1 | 6/2002 | Austin et al. | |
| 2002/0123926 A1 | 9/2002 | Bushold et al. | |
| 2003/0009393 A1* | 1/2003 | Norris ............................. | 705/27 |
| 2003/0158818 A1* | 8/2003 | George et al. ................... | 705/64 |
| 2003/0236704 A1 | 12/2003 | Antonucci | |
| 2004/0181453 A1 | 9/2004 | Ray et al. | |
| 2004/0193485 A1 | 9/2004 | Ilberg | |
| 2004/0200898 A1 | 10/2004 | Kepecs | |
| 2005/0149394 A1 | 7/2005 | Postrel | |
| 2008/0033793 A1* | 2/2008 | Roberts .......................... | 705/14 |
| 2008/0077499 A1 | 3/2008 | Ariff et al. | |
| 2008/0249813 A1 | 10/2008 | Schmeyer | |
| 2009/0030793 A1 | 1/2009 | Fordyce, III | |
| 2009/0037325 A1 | 2/2009 | Sarelson et al. | |
| 2009/0048917 A1 | 2/2009 | Blake et al. | |
| 2009/0150244 A1* | 6/2009 | Ciancio et al. .................. | 705/14 |
| 2010/0049651 A1* | 2/2010 | Lang et al. ...................... | 705/38 |
| 2011/0153406 A1* | 6/2011 | Mackin et al. ............. | 705/14.35 |
| 2012/0072349 A1 | 3/2012 | Bernstein et al. | |
| 2013/0218658 A1* | 8/2013 | Crowe et al. .............. | 705/14.33 |

OTHER PUBLICATIONS

USPTO, Office Action dated Jul. 6, 2012.
USPTO, Office Action dated Aug. 15, 2012.

* cited by examiner

*Primary Examiner* — Matthew L Hamilton
(74) *Attorney, Agent, or Firm* — Klintworth and Rozenblat IP LLC

(57) ABSTRACT

A system and method for providing a loyalty program by utilizing a pre-existing association network. When a consumer is registered with the program, the consumer's personal information is stored in a database and associated with a token ID. The token is capable of initiating a transaction message request over an association network when used in conjunction with a merchant transaction system. A program manager is provided that includes an association network interface for receiving over the association network the transaction request message initiated by the token at a merchant, where the transaction request message includes a first set of transaction information regarding a consumer-initiated product purchase transaction. The program manager is then configured to store the first set of transaction information, transmit to the merchant a response message that includes an indication that the token cannot provide tender for a product purchase, and utilize the first set of transaction information to facilitate the identification of one or more rewards for the consumer.

19 Claims, 3 Drawing Sheets

SYSTEM AND METHOD FOR MANAGING A LOYALTY PROGRAM VIA AN ASSOCIATION NETWORK INFRASTRUCTURE

TECHNICAL FIELD OF THE DISCLOSURE

The present invention relates to a loyalty and reward program, and in particular to a loyalty and reward program capable of tracking and processing rewards utilizing the pre-existing infrastructure of an association network.

BACKGROUND OF THE DISCLOSURE

In order to attract and retain customers, many merchants, such as airlines, hotels car rental companies, chain retailers, telecom providers, and the like have historically implemented frequent use programs that offer awards for incentives schemes based on purchases made by that customer. One type of loyalty program is generally referred to as a closed loop program. A closed loop program involves a single merchant database to verify and store transaction information. This database typically is built by the merchant, or subcontracted to an outside vendor for this purpose, and is operated and maintained within the IT infrastructure of the merchant or it's vendor.

In a typical closed loop program, when a customer is at a point of sale (POS) terminal they will at some point in the transaction scan their customer loyalty number (either by physically scanning a card, punching in their customer ID or using any other token that a merchant may have chosen to track customer information). This ID is then passed to the loyalty database where information about the current transaction is typically stored. Information about offers and rewards may then be passed back to be included with the current transaction in some form. After (or during) the process of scanning goods and establishing prices, the merchant could therefore potentially offer promotions. For example, a loyalty customer for a grocery store could receive a 20% discount on his purchase (or potentially a single item) based on what he purchased and contingent on the fact that he is a loyalty cardholder and had provided his loyalty number during the course of the purchase transaction. After promotions or other rewards have been established, the customer then provides tender for the transaction. Tender is often cash, credit, check and the like. In the case of credit or debit, a data flow is generated through a network association (i.e. Visa, MasterCard, Discover, American Express, etc.) to a processor and a response (approval/decline) is typically provided.

To implement a closed loop loyalty program for a merchant, unique hardware or software must be installed at the merchant's point of sale to collect user's purchase information. Because of the necessary expense of these systems, many merchants are prevented from utilizing such services and thus are very limited in the types of loyalty or promotional programs they can offer. This presents a difficult obstacle for many merchants and in particular, many local businesses have difficulty competing with regional and national chains. These businesses' fate initially depends on a local, loyal customer base. However attracting this type of customer in an area where a resource rich larger company has recently moved in or is already doing business may present a problem as the large companies can afford the overhead cost of running and administering these programs unlike many other businesses. For example, a small family owned coffee shop may want to award reward points to allow users to redeem accumulated reward points for free or discounted coffee, but they are unable to do so due to the aforementioned high costs involved. A national chain, on the other hand, may have no such issue.

Another type of loyalty program is generally referred to as an open loop program. Open loop loyalty programs are typically run by credit card issuers and aggregate rewards with a particular merchant or class of merchants (i.e. airline reward cards). In an open loop program, a customer is not able to obtain a reward or discount at the time of the purchase and is generally not rewarded for frequenting any particular merchant. In particular, after the goods have been added to the transaction and prices have been established, the customer provides their form of payment, which is typically a credit card issued by the loyalty program manager on one of the large open loop networks, such as MasterCard, VISA, American Express, Discover and the like, which heretofore have been used exclusively for transmission and approval of financial transactions. An initial authorization request is then sent from the merchant to the card processor. This is utilized to collect data for the loyalty program (which may be managed by the card processor or another entity linked to the card processor). Typically, the total amount of the purchase is collected to determine awards which may be recorded as points. An acceptance or decline of the authorization request is then transmitted back to merchant. After the transaction has settled, the program can award points based on the customers qualifying purchases. For example, if Customer X spends $Y with his Reward Credit Card, he will receive Z points towards a flight on a participating airline.

Thus, in order to obtain the benefit of an open loop system, the customer is required to only use the loyalty card (credit card) as a form of tender. Any purchases using tender other than the loyalty card are not able to be included within this type of program. Open loop programs also generally do not provide rewards specific to a merchant where the loyalty card is used, nor can they facilitate the applications of discounts or other offers at the time of purchase.

SUMMARY OF THE INVENTION

The present invention provides a system and method for providing both merchant-specific and non-merchant specific rewards through a low cost loyalty program utilizing a pre-existing association network. In one aspect, the invention may include a method comprising the steps of (1) registering a consumer with the loyalty program, where said registration includes obtaining personal information for the consumer and associating with the consumer a token capable of initiating an transaction message request over an association network when used in conjunction with a merchant transaction system; (2) receiving the transaction request message initiated by the token, where said transaction request message includes a first set of transaction information regarding a consumer-initiated product purchase transaction; (3) obtaining the first set of transaction information from the received transaction request message; (4) transmitting, to the merchant, a response message in response to the transaction request message, wherein the response message includes an indication that the token cannot provide tender for a product purchase; and (5) utilizing at least part of the first set of transaction information to facilitate the identification of one or more rewards for the consumer.

In another aspect, the present invention may also include a system having a user interface for obtaining personal information for a consumer and a token capable of initiating a transaction message request over an association network when used in conjunction with a merchant transaction system. The system further includes an association network interface for receiving over the association network the transaction request message initiated by the token at a merchant, and transmitting to the merchant a response message in response to the transaction request message. The transaction request message may includes a first set of transaction information regarding a consumer-initiated product purchase transaction, and the response message may include an indication that the token cannot provide tender for a product purchase. The system may also include a database for storing the personal information of the consumer and the first set of transaction information. The first set of transaction information may then be utilized to facilitate the identification of one or more rewards for the consumer. In one embodiment, the system may also include a communication network interface for establishing a link with a merchant system over a communication network to obtain a second set of transaction information, which may also be utilized to facilitate the identification of rewards.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION OF THE DISCLOSURE

Figure 1:
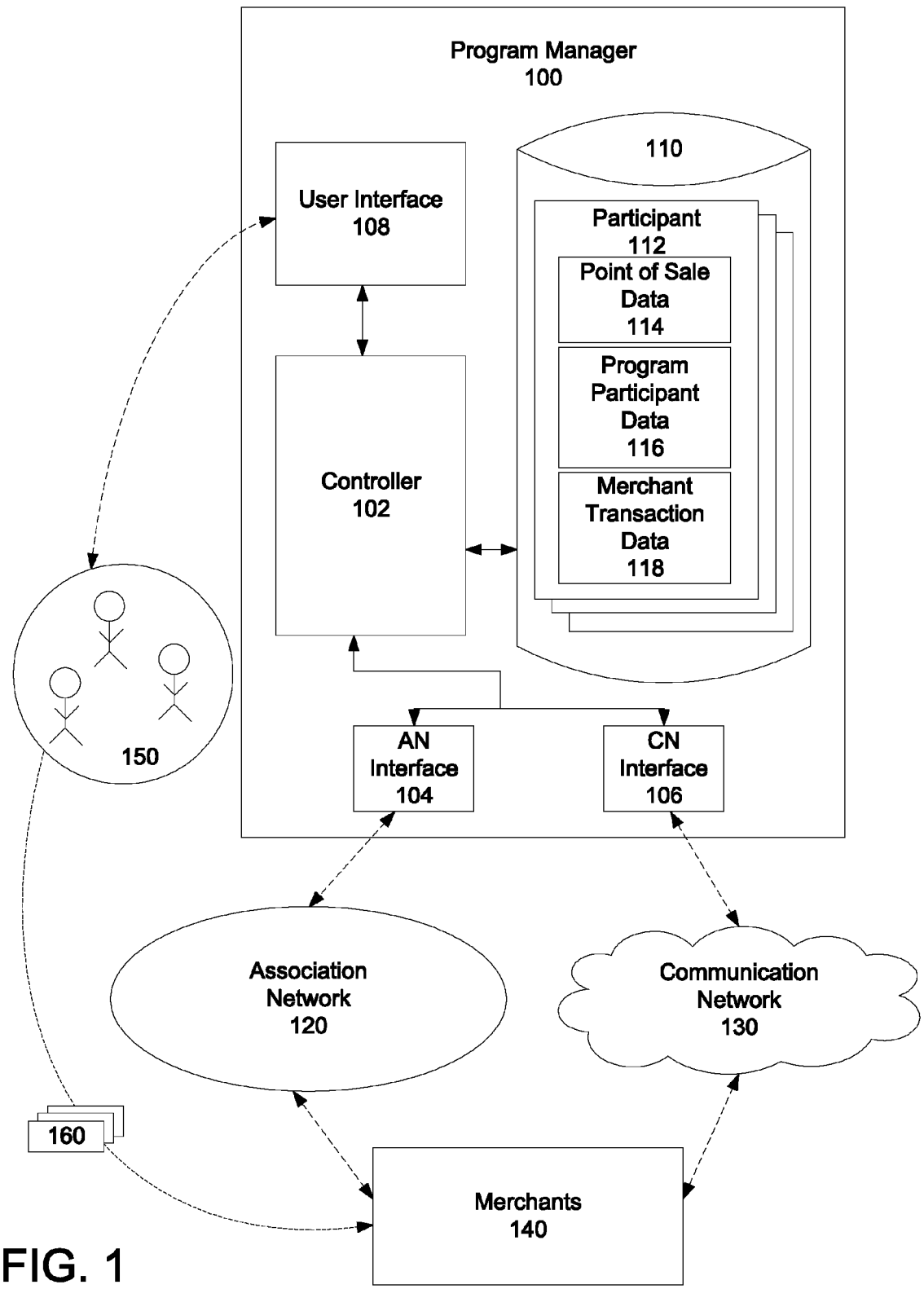
FIG. 1 shows one embodiment of a loyalty program system in accordance with the present invention.

The present invention is a system and method that provides a maintainable, low cost loyalty program by utilizing a pre-existing association network, such as a credit card network (which virtually all merchants already have access to if they accept credit transactions), to track consumer information and process rewards. FIG. 1 illustrates one exemplary embodiment of a system in accordance with the present invention. In this embodiment, the system includes a program manager 100 capable of communicating with merchants 140 via an association network 120. In accordance with the present disclosure, a merchant 140 may be any provider of products (which may be goods, services, downloadable content, etc.), including manufacturers, wholesalers, retailers, or the like, that has the capability to process transactions using an association network. An association network may be any credit card association network, such as Visa, MasterCard, Discover, American Express, and the like. It should also be understood that a credit card association network is not limited only to use by credit cards, but may also be used for debit card transactions or similar form of tender.

As will be set forth in further detail below, the program manager 100 is responsible for receiving merchant-initiated transactions from the association network 120, responding to those transactions, and collecting information necessary to manage and implement the loyalty program. In one embodiment, this information is collected from merchant-initiated transactions over the association network 120. Additionally, as shown in FIG. 1, the program manager may also be capable of establishing a direct link with a merchant POS systems using a communication network 130 in order to obtain additional data following the merchant-initiated transaction. The communications network may be any network through which data can be exchanged between the merchant 140 and the program manager 100, including the Internet, a Wide Area Network (WAN), a telephone circuit-switched network, or the like. Also, although the program manager 100 is illustrated as a single entity, it should be understood the program manager 100 may be operated by a single company or several companies cooperating together to provide the services described below.

The program manager 100, as illustrated in FIG. 1, may include a controller 102 for managing communications and data in accordance with the loyalty program described herein, an association network interface 104 to receive and respond to merchant-initiated transactions over the association network 120, and a communication network interface 106 to communicate with merchant systems over the communication network 130. The program manager 100 may also include a user interface 108 configured to permit users (also referred to herein as participants or consumers) to register with the loyalty program, manage and update their information, check their rewards, and the like. The user interface 106 may be any type of known interface, including a web site, an interactive voice response system, a proprietary widget, etc.

In one embodiment, when a consumer 150 registers to become a participant of the loyalty program they are requested to provide certain personal information. This may include their name, address, phone number, e-mail address and such. Upon registration, the participant is also provided with a token 160 having an ID number. As will be described in more detail below, the token may then be utilized by the consumer during a merchant transaction to participate in the loyalty program described herein. The token may be any element (either physical or virtual) that allows a customer to identify themselves using elements recognized by Association Networks. For example, in an embodiment where the association network is a credit card network, the token may be in the form of a card that is associated with a 16 digit code and has a magnetic strip that can be scanned at a typical merchant POS terminal similar to a credit or debit card. The token may also be in the form of a PayPass® or any other device capable of initiating an authorization request to a credit card network. In yet another embodiment, a token ID number may simply be provided to the consumer without any physical device, in which case the consumer would need to key in their token number.

As shown in FIG. 1, a database 110 may also be provided to store participant information 112 related to each of the participants 150 of the system. The participant information 112 may include point of sale data 114, program participant data 116, and merchant transaction data 118. The point of sale data 114 preferably includes information obtained from a merchant-initiated transaction transmitted over an association network 120. The program participant data 116 preferably includes personal information provided by the participant when they registered for the loyalty program (such as name, address, phone number, email address, and/or other personal information) as well as a token ID number associated with the participant and any other information deemed necessary to facilitate management of any particular program. The merchant transaction data 118 preferably includes detailed transaction information that was collected by the merchant at the time of the transaction, and then obtained from the merchant via a link established over the communication network 140. Of course, it should be understood that although the database 104 is illustrated as being operated within the program manager, the database may be located at a location remote from the program manager. The database may also reside on a single server or distributed among multiple servers.

Figure 2:
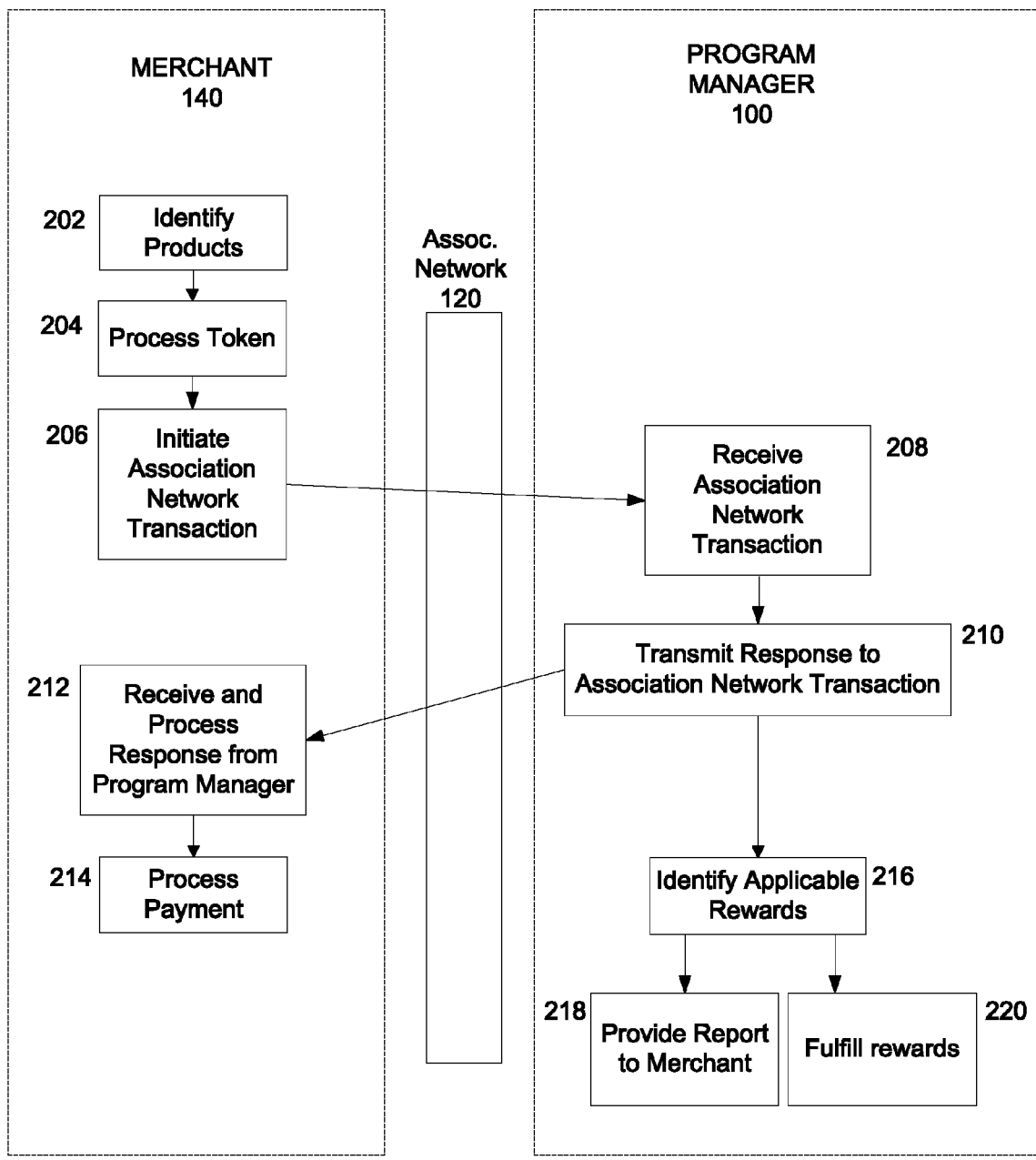
FIG. 2 shows one embodiment of a process for administering and managing the loyalty program in accordance with one aspect of the present invention.

FIG. 2 illustrates one exemplary process for operating a loyalty program in accordance with the present invention. As with any purchase transaction, the merchant first identifies the products being purchased by a consumer in step 202. For example, at a brick and mortar store, this may include scanning the products and identifying their associated price. At an on-line store, this may involve having the consumer designate the products to be purchased in a virtual "cart." The specific method of identifying the products and their associated price is not critical to the present invention.

After the products are identified, the merchant requests a form of tender from the consumer to pay for the transaction. At this point, before providing the tender, the consumer provides a token to be processed by the merchant in step 204. For example, at a brick and mortar store, this may involve swiping a card or keying in a 16-digit code at a POS terminal, similar to a credit or debit card transaction. At an online store, this step may involve entering the 16 digit code associated with the token via a website. The consumer also preferably, but not necessarily, informs the merchant that the consumer has provided a token associated with a loyalty program.

Processing of the token initiates an association network transaction over the association network 120 in step 206. In an embodiment where the association network 120 is a credit card network, the association network transaction may be in the form of any pre-defined transaction request message that is capable of being transmitted over the credit card network. As examples, the transaction request message may be in the form of a balance inquiry message, an active/load message, an authorization request, a partial authorization request, or the like. Unlike a typical credit card transaction, however, the transaction request message here is intended to terminate at the program manager 100 rather than a bank or other credit card issuer. In another embodiment, the transaction request message may also be a message specifically created to be used only in conjunction with the loyalty program described herein.

In step 208, the program manager 100 receives the transaction request message and collects information embedded within the request, which is stored in database 110. Depending on the form of the transaction request message, the collected information may include, for example, the price of the identified products, an identifier of the merchant from which the request was sent, an identifier of the POS terminal from which the request was sent, the time stamp associated with the transaction request message, and/or the ID number associated with the processed token. The transaction information is therefore preferably sufficient to associate a particular purchase transaction with a particular merchant. Additionally, as the program manager 100 also already possesses personal data regarding the consumer (which includes the token ID number), the transaction information (which also includes the token ID number) is also sufficient to associate the purchase transaction with the consumer.

In step 212, the program manager 100 provides a response to the transaction request message, and sends the response back to the merchant via the association network 120. In an embodiment where the association network 120 is a credit card network, the response preferably provides an indication that the token cannot be used as tender to pay for the transaction. For example if the transaction request message was a balance inquiry message, the response would preferably indicate a balance of zero (0) dollars. Similarly, if the transaction request message was an authorization request, the response would preferably be in the form of a "decline transaction" message to indicate that the authorization request was denied. Since the various types of pre-defined transaction request and response messages described herein are well-known in the art, their formation and transmission are not discussed in further detail here.

When the merchant receives the response message, the merchant will generally inform the consumer of the event and request that a different form of payment be provided. In step 214, the merchant will then process the transaction using a proper form of payment to complete the transaction, such as an actual credit card, a debit card, cash, or the like.

In step 216, the program manager 100 may then utilize the POS information obtained from the initiated authorization transaction to determine whether the consumer is entitled to any rewards, such as coupons, discounts, promotions, or the like. The program manager may also provide a report (either electronically or physically) to the merchant in step 220 indicating the consumer's activity, or fulfill the rewards (directly, or through a third party) in step 222. The rewards may be processed and provided to the consumer in any manner and the present invention is not intended to be limited to any type of reward or method for providing them to the consumer.

Thus, in accordance with the process described in FIG. 2, the program manager 100 is capable of collecting sufficient information to facilitate a loyalty program for a merchant or a group of merchants (either cooperating with another or not) without requiring any modification of any merchant's purchase processes or POS systems. The collected information is also stored completely within the systems of the loyalty program, and may in fact be accomplished without any cooperation on the part of the merchant, and without requiring the merchant to provide any information other than what is communicated when the consumer's token is processed. Indeed, as would be understood from the above, the merchant may have no knowledge regarding when or what transaction information has been captured by the program manager 100.

Figure 3:
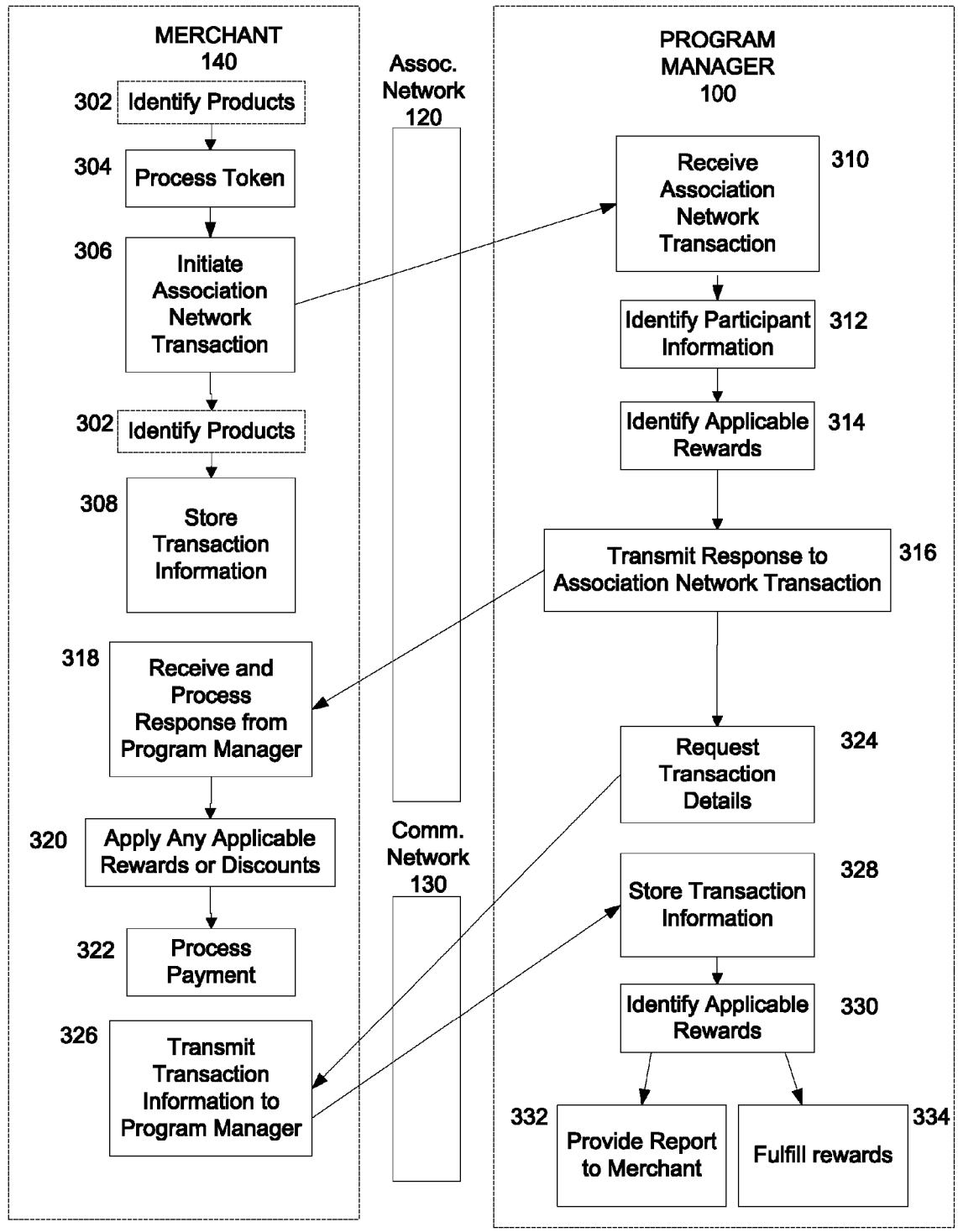
FIG. 3 shows one embodiment of a process for administering and managing the loyalty program in accordance with another aspect of the present invention.

FIG. 3 illustrates another embodiment of a process for operating a loyalty program in accordance with the present invention. Like the process described in FIG. 2, the process of FIG. 3 is configured to utilize existing transaction codes defined within an association network to communicate POS transaction information from the merchant to the program manager 100. However, unlike the process in FIG. 2, the process of FIG. 3 describes a loyalty program where the merchant is capable of further providing additional purchase transaction details to the program manager 100 after the purchase is complete, as well as potentially receiving information during the purchase transaction that may facilitate offers or other actions during the purchase.

As in step 202 above, the merchant identifies the products being purchased by the consumer, and their associated price, in step 302. However, in the embodiment illustrated in FIG. 3, step 302 may be performed either before or after the consumer's token is processed. In step 304, the participant's token is processed (either by swiping a card, keying in a number, or the like) and an association network transaction is initiated by the merchant in step 306, which causes a transaction request message to be transmitted to the program manager 100. At least part of the transmitted transaction information is then also stored by the merchant POS terminal in step 308, along with additional details of the transaction, such as SKU numbers, specific prices of each product involved in the transaction, and the like. As will be described in more detail below, this is done so that a linking tag can later be established between the merchant's systems and the program manager 100.

In one embodiment, the transaction request message may be in the form of an authorization request, a partial authorization request, an active/load transaction message or another type of pre-defined association network transaction request message capable of identifying a dollar amount. If the products, and their associated price amounts, were identified before the authorization request was initiated, the transaction message may then include the price total of the transaction (along with an identifier of the merchant from which the request was sent, an identifier of the POS terminal from which the request was sent, the time stamp associated with the transaction request, and/or the ID number associated with the processed token). However, if the products, and their associated price, were not identified before the transaction message was submitted, the identified amount may simply be either a predetermined dollar amount or a randomly generated dollar amount.

Of course, it should be understood that while it may be beneficial to utilize a transaction request message capable of identifying a dollar amount, it is contemplated that the transaction message may also be in the from of other pre-defined messages, such as a balance inquiry message, that do not identify a dollar amount information in the merchant-initiated request message but may be capable of identifying a dollar amount in the response message. As described below, such transaction requests messages may, depending on the requirements of the system, facilitate certain functionality of the loyalty program due to the additional information carried in the related response message.

In step 310, the program manager 100 receives the transaction request message from the merchant. The program manager 100 may then identify certain participant information associated with the token ID transmitted in the transaction message in step 312. For example, if provided with promotional details and codes for a merchant in advance, the program manager 100 may be configured to identify whether the participant qualifies for any specific rewards to be applied to the current transaction in step 314. In step 316, the program manager 100 sends a response message back to the merchant, preferably in a form that is appropriate in responding to the message type utilized for the initiated transaction message. The response message is then received by the merchant in step 318

Once received, the response message may also be used by the merchant's systems to facilitate a real-time generation of loyalty or promotional rewards as part of the transaction in step 320. For instance, the response message may provide specifics about the customer's reward status within the loyalty or promotion program that can be then used to drive specific offers or actions within the transaction. The specific details for determining what offers or actions to take may reside either within the program manager (in which case the information identifying the rewards is transmitted a part of the response) or within the merchant's system (in which case the merchant uses the provided information to identify the appropriate reward).

For example, in an embodiment where the transaction request message initiated by processing of the token by a merchant is in the form of a balance inquiry transaction message, a partial authorization request, or the like, the response message may include a dollar amount typically used to identify a card balance. For purposes of this invention, however, this dollar amount may be generated based on information the program manager 100 has obtained regarding the consumer, the current transaction, and/or past transaction, and may then be used by the merchant to facilitate promotion activities. For instance, in response to receiving a balance inquiry message initiated at a merchant that processes a token, the program manager 100 may determine that the consumer should be given a 10% discount on the current transaction. The response message may then include a dollar amount of "10" in the balance field of the message to indicate to the merchant that a 10% discount should be applied. The dollar amount may also be used to provide other information. For example, the balance amount identified in the response message may be indicative of a status level of the consumer, provide an indication of the number of transactions the consumer has made at the merchant (or group of merchants), or other information that may be utilized in facilitating promotional programs.

Of course, it is understood that similar benefits may be obtained using other transaction message request types (either pre-existing message types that are typically used for credit card transactions, or custom message types designed for use only with the loyalty program) so long as the response message is configured to include one or more fields that can be updated on demand by the program manager 100. The field used to provide information within a response message also need not be a numerical field, but may be any updatable field so long as the merchant system is configured to receive and interpret the transmitted information appropriately. For example, in one embodiment, a response message may include one or more fields to identify to the merchant more detailed rewards information, or the name, address, email, phone number, or other consumer information.

After the program manager 100 has received the POS information in step 310, the program manager 100 has sufficient information to identify a particular purchase transaction within the merchant's databases at a later time. Accordingly, in step 325, the program manager initiates a link between the program manager and the merchant's system, over communication network 130, to request additional transaction details. In one embodiment, this is accomplished by the program manager 100 transmitting a file or other communication to the merchant with sufficient information to identify a particular purchase transaction (or batch of transaction). This information may include the POS terminal ID, date, time and potentially amount of the transaction. In step 326, the merchant then locates the specified transaction and communicates its details (such as SKU level detail) back to the program manager, which stores the transaction information in step 328.

The additional transaction information may then be used to further facilitate the identification of rewards, which may then be provided to the merchant in step 334 or fulfilled by the program manager 100 on behalf of the merchant in step 336.

The additional transaction information may therefore enable the implementation of loyalty or promotion programs that can include offers tying specific products, merchants and/or time periods together.

In one embodiment, this additional transaction information may also provide the program manager 100 with the ability to detect and respond to potential program abuses by consumers or others. For example, the transaction details obtained from the merchant in step 330 can be compared and validated against the transaction information collected by the program manager in step 310. This validation may be valuable to ensure that a consumer is not given undeserved credit for a transaction that was initiated but never completed. This validation would also establish a solid audit trail of all potentially qualifying transactions in a loyalty or promotion program, thus facilitating the effective and efficient resolution of any customer queries related thereto.

Based on the above description, it is evident that the present loyalty program system and method provide numerous advantages over traditional programs. Unlike traditional programs, the present invention allows collection of data from any merchants connected to an association network, with no (or minimal) special hardware or software required, and in some cases even without the knowledge or cooperation of the merchant.

The approach described herein also facilitates a wide variety of potential programs. For example, loyalty programs can be established that group merchants in an almost limitless number of potential configurations (geographic, store type, manufacture or supplier base, etc.). Because merchant transaction data can be collected without the merchant's participation, the present invention would also allow for the development of a customer database for a merchant with some level of purchase history already collected before the merchant has even signed up for a loyalty program.

Through the processes described above, the program manager is also capable of offering a variety of valuable services within a single loyalty program. For instance, reporting of customer behavior can be provided to the merchant and used for a variety of marketing and promotional activities. Analysis (both real-time and after the fact) of qualifying purchases against various program rules and parameters can be performed to determine offers, awards or other actions to be taken with regard to a particular customer and/or transaction. The program manager 100 can also utilize the obtained information to fulfill the actual awards or offers to the customer on behalf of the merchant (or group of merchants, either cooperating or not).

The flexibility of the system described herein also permits consumers to redeem rewards in any one of multiple ways. For example, depending on the configuration of the system, the participant may redeem awards earned from the transaction with the merchant at the time of the transaction or at a later time, or may redeem the rewards with another merchant in the same marketing cluster, or may aggregate those offers or rewards with those of other merchants into an exchange account and then redeem the aggregated rewards for goods or services from any approved merchant on the network. The participant's reward account data may also be utilized by the merchant so that the merchant may target additional marketing efforts at the user.

It should also be understood that the data flows described above are such that only the program manager can fully manage the loyalty program. This is because the merchant only knows details of the token being processed and the specific purchases made within their stores. The merchant therefore has no ability to link any particular purchase with any particular customer or to group purchases by customer or any other program parameters (like purchases that customer X made between the dates of Y and Z). This is because the customer details collected when the customer signed up for the loyalty or promotion program are required to link the information from the POS initiated association network transaction as well as the additional transaction information obtained via a link over a communication network.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for providing a loyalty program comprising:
    registering a consumer with the loyalty program, said registration including obtaining personal information from the consumer and associating with the consumer a token to initiate a transaction request over an association network when used in conjunction with a merchant transaction system, wherein the token is associated with a form of tender;
    receiving by a processor the transaction request initiated by the token from the merchant transaction system, said transaction request, containing information sufficient to identify the token and a transaction, wherein the transaction request is transmitted over the association network;
    determining, by the processor, that the token cannot be used as tender to pay for the transaction and then determining whether the consumer is entitled to any rewards from the loyalty program in response to receiving the transaction request initiated by the token;
    transmitting by the processor, via the association network a message to the merchant transaction system, indicating any applicable rewards and indicating that the token cannot be used as tender in response to the receiving the transaction request initiated by the token;
    receiving, by the processor, from the merchant transaction system, additional details of the transaction stored at the merchant transaction system, during or after completion of the transaction tied to the token that cannot be used as tender, wherein the additional details of the transaction are transmitted over a communications network separate and distinct from the association network;
    matching, by the processor, the information in the transaction request to the additional details of the transaction; and
    transmitting any additional rewards to the consumer in response to the matching of the information in the transaction request to the additional details of the transaction.

2. The method of claim 1 wherein the association network is a credit card network.

3. The method of claim 2 wherein the token is associated with a 16 digit code.

4. The method of claim 2 wherein the token is a card having a magnetic strip.

5. The method of claim 3 wherein the transaction request includes information indicating the 16 digit code associated with the token.

6. The method of claim 5 wherein the transaction request includes information indicating at least one of a merchant or the merchant transaction system from which the transaction request was transmitted.

7. The method of claim 5 wherein the transaction request includes a dollar amount related to the consumer initiated product purchase transaction.

8. The method of claim 5 wherein the transaction request includes a time stamp.

9. The method of claim 2 wherein the transaction request is one of an authorization request message, a partial authorization request message, an active/load transaction message, or a balance inquiry message.

10. The method of claim 2 wherein the message includes information to facilitate identification of one or more rewards for the consumer.

11. The method of claim 10 wherein the message includes information to be used by a merchant to identify whether the consumer qualifies for a reward to be applied to the transaction.

12. The method of claim 10 wherein the message includes information that identifies whether the consumer qualifies for a reward to be applied to the transaction.

13. The method of claim 12 wherein the message includes a dollar amount value, the dollar amount value being indicative of a reward to be provided to the consumer.

14. The method of claim 1 further including initiating a link with the merchant transaction system over a communication network and requesting, from the merchant transaction system, additional details of the transaction for the consumer initiated product purchase transaction.

15. The method of claim 14 wherein the additional details of the transaction in the merchant transaction system is identified based on a previously received transaction request.

16. The method of claim 14 wherein the additional details of the transaction includes details of the products involved in the consumer initiated product purchase transaction.

17. The method of claim 14 further including utilizing at least part of the additional details of the transaction to facilitate identification of one or more rewards for the consumer.

18. The method of claim 1 further comprising transmitting the message by the processor to the merchant transaction system indicating that the consumer is entitled to a reward.

19. The method of claim 18, wherein the message is transmitted by the processor to the merchant transaction system before processing the transaction using a proper form of payment.

* * * * *